(12) United States Patent
Hatanaka

(10) Patent No.: US 8,189,102 B2
(45) Date of Patent: May 29, 2012

(54) IMAGE PROCESSING APPARATUS USING INTERPOLATION DIRECTION

(75) Inventor: Hideaki Hatanaka, Kyoto (JP)

(73) Assignee: Panasonic Corporation, Osaka (JP)

( * ) Notice: Subject to any disclaimer, the term of this patent is extended or adjusted under 35 U.S.C. 154(b) by 384 days.

(21) Appl. No.: 12/492,250

(22) Filed: Jun. 26, 2009

(65) Prior Publication Data

US 2009/0322941 A1 Dec. 31, 2009

(30) Foreign Application Priority Data

Jun. 27, 2008 (JP) ................................. 2008-168351

(51) Int. Cl.
*H04N 11/02* (2006.01)
*H04N 7/04* (2006.01)

(52) U.S. Cl. ....................................... 348/441; 348/469

(58) Field of Classification Search .................. 348/444, 348/445, 448, 453, 469, E7.003, E7.012; 375/240.01, 240.21; 382/300; 345/604–605
See application file for complete search history.

(56) References Cited

U.S. PATENT DOCUMENTS

| | | | | |
|---|---|---|---|---|
| 5,528,274 A | * | 6/1996 | Hyodo | 347/172 |
| 5,552,825 A | * | 9/1996 | Talluri et al. | 348/222.1 |
| 5,703,968 A | * | 12/1997 | Kuwahara et al. | 382/269 |
| 5,712,687 A | * | 1/1998 | Naveen et al. | 348/453 |
| 5,832,143 A | | 11/1998 | Suga et al. | |
| 6,674,464 B1 | * | 1/2004 | Mizutani et al. | 348/222.1 |
| 7,961,232 B2 | * | 6/2011 | Muresan | 348/246 |
| 2002/0025069 A1 | * | 2/2002 | Endo et al. | 382/167 |
| 2002/0080269 A1 | * | 6/2002 | Gotanda et al. | 348/448 |

FOREIGN PATENT DOCUMENTS

| | | |
|---|---|---|
| JP | 07-177517 | 7/1995 |
| JP | 10-023460 | 1/1998 |
| JP | 2003-199054 | 7/2003 |

\* cited by examiner

*Primary Examiner* — Lin Ye
*Assistant Examiner* — Euel Cowan
(74) *Attorney, Agent, or Firm* — Renner, Otto, Boisselle & Sklar, LLP

(57) ABSTRACT

According to the present invention, in converting an interlaced signal in 4:2:0 format into an interlaced signal in 4:2:2 format, diagonal correlation is detected using a luminance signal and color-difference signals are also interpolated diagonally based on a result of the detection. As a result, the quality of the image represented by the color-difference signals can be improved and the signal can be converted into the 4:2:2 format with the block noise of the color-difference signals, which could be produced in an MPEG decoded image in the 4:2:0 format, reduced.

6 Claims, 4 Drawing Sheets

IMAGE PROCESSING APPARATUS USING INTERPOLATION DIRECTION

BACKGROUND OF THE INVENTION

1. Field of the Invention

The present invention relates to an image processing device for performing a format conversion, and more particularly relates to an image processing device that converts decoded video data in the 4:2:0 sampling format as defined by an MPEG standard into data in 4:2:2 sampling format and outputs the converted data.

2. Description of the Related Art

A moving picture's video data can be transmitted efficiently by compressing the data compliant with the MPEG-2 standard, for example. According to Main Profile @ Main Level, which is one of the most commonly used methods by the MPEG-2 standard, a luminance signal (Y) and color-difference signals (Cb, Cr) are sampled in a sampling format, in which these signals are sampled at a ratio of 4 to 2 to 0, thereby generating video data, which is then encoded with a frame structure compatible with non-interlaced scanning. Meanwhile, TV receivers and other video appliances adopt interlaced scanning and are normally designed to sample and process a luminance signal (Y) and color-difference signals (Cb, Cr) in a sampling format in which they are sampled at a ratio of 4 to 2 to 2.

That is why in processing video data generated by Main Profile @ Main Level, conventional image processing devices interpolate the color-difference signals decoded, thereby converting the video data in the 4:2:0 sampling format into data in the 4:2:2 sampling format and also outputting the decoded data with the scanning methods changed into the interlaced one.

A technique for converting video data in the 4:2:0 sampling format into data in the 4:2:2 sampling format is disclosed in Japanese Patent Application Laid-Open Publication No. 10-23460.

FIG. 7 illustrates a conventional image processing device for interpolating a color-difference signal. First of all, a color-difference signal c is received at a color-difference signal input terminal 202 and then supplied to a line memory 207, which stores data about the color-difference signal c for one horizontal scanning period and then will output a delayed color-difference signal dlyc in another horizontal scanning period. An interpolated data generating section 208 receives the color-difference signal c and the delayed color-difference signal dlyc, newly generates an interpolated color-difference signal by performing interpolation on the two color-difference signals, and then outputs it through a color-difference signal output terminal 204.

Next, it will be described with reference to FIG. 8 how the interpolated data generating section 208 generates the interpolated color-difference signal. Specifically, to convert the 4:2:0 sampling format compliant with the MPEG-2 into the desired 4:2:2 sampling format, interpolation calculations are carried out. For example, to obtain an interpolated color-difference signal Cb1, the following calculation:

$$Cb1=(Ca1\times5+Ca2\times3)/8$$

is carried out. And to obtain an interpolated color-difference signal Cb2, the following calculation:

$$Cb2=(Ca1\times1+Ca2\times7)/8$$

is carried out. In this manner, the interpolated data generating section 208 receives the two color-difference signals supplied and performs vertical interpolation processing (i.e., calculates a distance average by interpolation), thereby generating an interpolated color-difference signal.

On the other hand, a luminance signal is received at a luminance signal input terminal 201 and then delayed for one horizontal scanning period by a line memory 209 so that the luminance signal and the color-difference signal will be output at the same time. And then it is output as a delayed luminance signal dlyy1 through a luminance signal output terminal 203. In this manner, video data in the 4:2:0 format is converted into an interlaced signal in the 4:2:2 format and the converted signal is output.

In this interpolation processing, the interpolation using the color-difference signal is carried out on only the color-difference signal, not on the luminance signal. A processing technique that also performs interpolation on a luminance signal could be processing for converting an interlaced signal in the 4:2:2 sampling format into a progressive signal in a finer 8:4:4 sampling format. According to such conversion processing, interpolation is carried out on a luminance signal using the luminance signal, and interpolation is carried out on a color-difference signal using the color-difference signal independently of the luminance signal.

SUMMARY OF THE INVENTION

The conventional image processing device that has been described with reference to FIGS. 7 and 8 performs interpolation processing on the color-difference signal just vertically, and therefore, cannot increase the vertical resolution of the color-difference signal any further. On top of that, according to an MPEG decoding technique, block noise could sometimes be produced both horizontally and vertically. In that case, if the interpolation were carried out only vertically, such a portion with the block noise would rather get more annoying to the viewer's eye.

It is therefore an object of the present invention to provide an image processing device that can not only increase the vertical resolution of a color-difference signal but also reduce the block noise.

An image processing device according to the present invention receives a video data signal, including a luminance signal and a color-difference signal, and generates a video data signal, of which the color-difference signal has been interpolated. The device is characterized by including: an interpolation direction determining section for determining a direction in which the color-difference signal is going to be interpolated by using the luminance signal in the video data signal yet to be interpolated; and an interpolated color-difference signal generating section for generating an interpolated color-difference signal by interpolating the color-difference signal in the video data signal yet to be interpolated either vertically or diagonally in the interpolation direction determined by using the luminance signal.

In one preferred embodiment, the luminance signal is not interpolated.

In another preferred embodiment, the interpolation direction determining section calculates a difference between the luminance signals in each of multiple directions and determines the direction in which the color-difference signal is going to be interpolated based on the differences that have been calculated between the luminance signals.

In still another preferred embodiment, the interpolated color-difference signal generating section generates the interpolated color-difference signal using components of the color-difference signal that are associated with the interpolation direction.

In yet another preferred embodiment, the video data signal yet to be interpolated has a sampling format in which a luminance signal (Y) and color-difference signals (Cb, Cr) are sampled at a ratio of 4:2:0, and the interpolated video data signal has a sampling format in which the luminance signal (Y) and the color-difference signals (Cb, Cr) are sampled at a ratio of 4:2:2.

An image processing method according to the present invention is designed to generate a video data signal, of which the color-difference signal has been interpolated, from a received video data signal including a luminance signal and the color-difference signal. The method includes the steps of: determining a direction in which the color-difference signal is going to be interpolated by using the luminance signal in the video data signal yet to be interpolated; and interpolating the color-difference signal in the video data signal yet to be interpolated either vertically or diagonally in the interpolation direction that has been determined using the luminance signal, thereby generating an interpolated color-difference signal.

The image processing device of the present invention can interpolate the color-difference signal either vertically or diagonally using the luminance signal, thus increasing the vertical resolution of the color-difference signal and reducing the block noise at the same time.

DETAILED DESCRIPTION OF PREFERRED EMBODIMENTS

Hereinafter, preferred embodiments of the present invention will be described with reference to the accompanying drawings.

1. On Image Recorder

Figure 6:
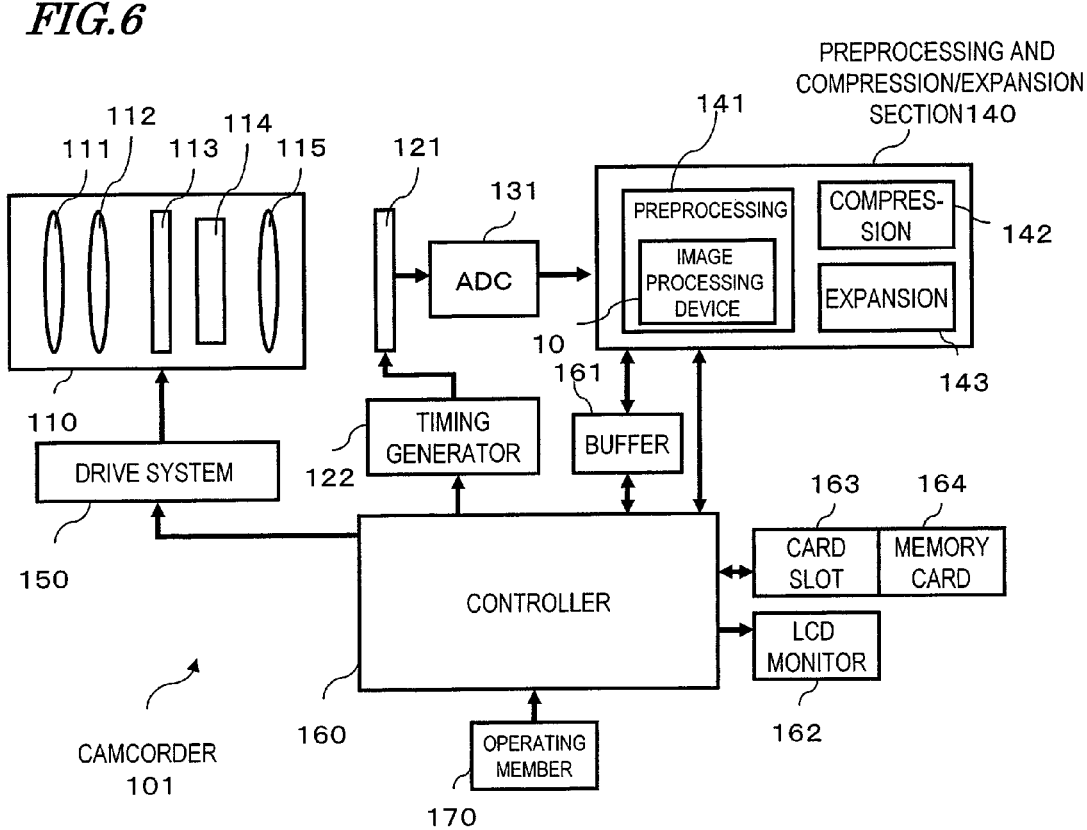
FIG. 6 illustrates a configuration for a camcorder in which an image processing device according to a preferred embodiment of the present invention is built.
Figure 7:
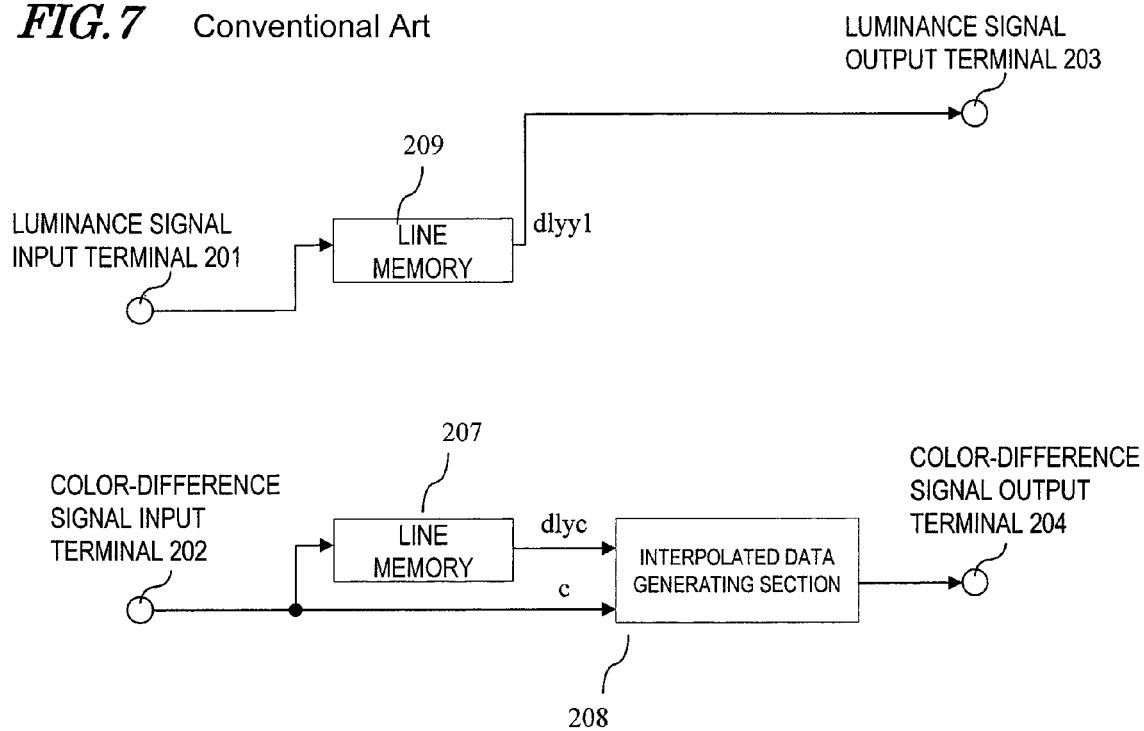
FIG. 7 illustrates a configuration for a conventional image processing device.
Figure 8:
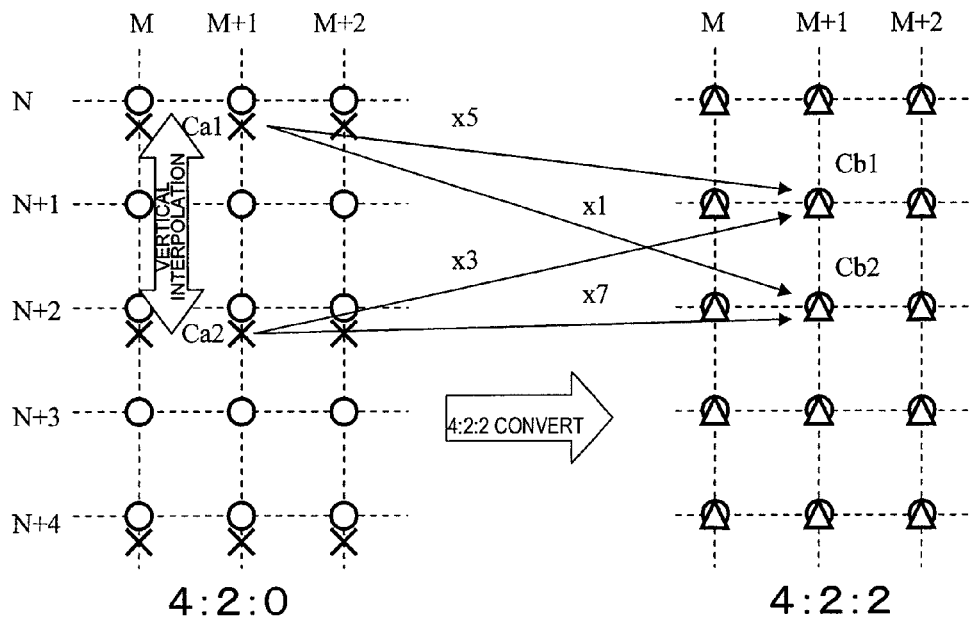
FIG. 8 illustrates how interpolated data may be generated according to a conventional technique.

FIG. 6 is a block diagram illustrating a configuration for an image recorder 101 as a specific preferred embodiment of the present invention. The image recorder 101 includes an image processing device 10 for performing interpolation on a color-difference signal. In the example to be described below, the image recorder 101 is supposed to be a camcorder. However, the present invention is in no way limited to that specific preferred embodiment. Alternatively, the present invention is also applicable for use in video recorders, personal computers, and various other devices that store images, not just camcorders. Optionally, the present invention could also be applied to read-only devices or display devices such as TV receivers. That is to say, the image processing device 10 of the present invention may be built in any arbitrary device that needs to perform interpolation on a color-difference signal.

It should be noted that the image processing device 10 could be implemented as a semiconductor integrated circuit device. Also, the image processing device 10 could be realized by either only hardware components or a combination of hardware components and a software program.

In this camcorder 101, a subject's image that has been produced by an optical system 110 is captured by an imager 121. The image data generated by the imager 121 is subjected to various kinds of processing by a preprocessing and compression/expansion section 140 and then stored on a memory card 164. The image data stored on the memory card 164 can be presented on an LCD monitor 162. A card slot 163 functions as a writing section for writing the image data on the memory card. The storage medium on which data is stored does not have to be a semiconductor memory such as the memory card but may also be a hard disk or an optical disc as well. Hereinafter, the configuration of this camcorder 101 will be described in further detail.

The optical system 110 includes an objective lens 111, a zoom lens 112, a lens stop 113, an OIS unit 114 and a focus lens 115. The optical system 110 condenses the light that has been reflected from the subject, thereby producing the subject's image. A drive system 150 drives the respective optical elements in the optical system 110.

The imager 121 captures the subject's image, which has been produced by the optical system 110, thereby generating image data. The imager 121 may be a CCD image sensor or a CMOS image sensor, for example. To drive the imager 121, a timing generator 122 generates a timing signal. An A/D converter 131 converts the image data that has been generated by the imager 121 into a digital signal.

The preprocessing and compression/expansion section 140 subjects the image data that has been converted by the A/D converter 131 to gamma correction, white balance correction and various other types of processing. By subjecting the image data to those types of processing, the preprocessing and compression/expansion section 140 generates image data to be stored on the memory card 164 or image data to be presented on the LCD monitor 162. Also, the preprocessing and compression/expansion section 140 processes the image data stored on the memory card 164 to generate the image data to be presented on the LCD monitor 162 or the image data to be stored again on the memory card 164. The preprocessing and compression/expansion section 140 may be implemented as a DSP or a microcomputer, for example.

A preprocessing section 141 subjects the image data that has been converted by the A/D converter 131 to gamma correction, white balance correction, flaw correction and various other types of image processing.

In the example illustrated in FIG. 6, the image processing device 10 is included in the preprocessing section 141. The image processing device 10 detects the diagonal correlation of a luminance signal and performs diagonal interpolation on a color-difference signal based on a result of the detection, thereby generating an interpolated color-difference signal. The configuration of the image processing device 101 will be described in further detail later.

A compressing section 142 compresses the image data in a format compliant with the MPEG-2 standard or the H.264 standard, for example, by performing DCT (discrete cosine transform), Huffman coding, or any other appropriate transform.

When compressed image data stored on the memory card 164 needs to be presented on the LCD monitor 162, for example, an expanding section 143 decompresses that image data.

A controller 160 is a means for controlling the overall camcorder 101 and may be implemented as a semiconductor device, for example. The controller 160 may consist of either hardware components only or a combination of hardware and software as well.

A buffer memory 161 serves as a work memory for the preprocessing and compression/expansion section 140 and the controller 160, and may be implemented as a DRAM or a ferroelectric memory, for example.

The memory card 164 may be inserted into, and removed from, the card slot 163, which can be connected to the memory card 164 both mechanically and electrically. The memory card 164 includes a flash memory or a ferroelectric memory as an internal memory and can store data thereon.

The LCD monitor 162 can present an image represented by either the image data that has been generated by the imager 121 or the image data that has been retrieved from the memory card 164. The LCD monitor 162 can also present various sorts of setting information and running time of the camcorder 101, for example.

An operating member 170 is a component that refers to any of various types of input devices collectively, and accepts a user's command and conveys that command to the controller 160.

2. On Image Processing Device

In this preferred embodiment, when outputting the video data stored on the memory card 164 to an external device, the image processing device 10 performs interpolation processing on a color-difference signal. Likewise, when presenting the video data that has been stored on the memory card 164 on the LCD monitor 162, the image processing device 10 also performs interpolation processing on the color-difference signal. The image processing device 10 may be used to decode image data that has been compressed compliant with an MPEG standard into an interlaced signal that can be displayed, for example.

Hereinafter, the configuration and operation of the image processing device 10 will be described in further detail.

Figure 1:
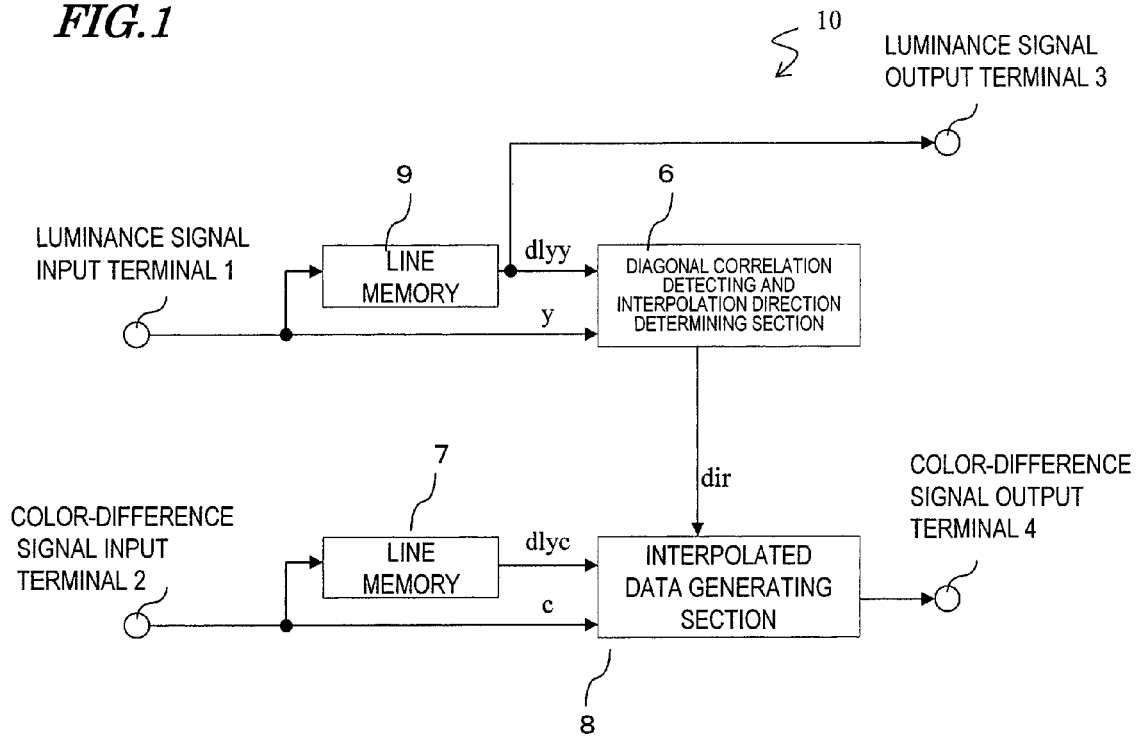
FIG. 1 is a block diagram illustrating a configuration for an image processing device as a preferred embodiment of the present invention.

FIG. 1 is a block diagram illustrating a configuration for the image processing device 10.

In order to output a luminance signal, which has been supplied from a luminance signal input terminal 1, and a color-difference signal at the same time, a 2H line memory 9 delays the luminance signal y for two horizontal scanning periods, thereby outputting a delayed luminance signal dlyy.

A diagonal correlation detecting and interpolation direction determining section 6 receives the incoming luminance signal y and the delayed luminance signal dlyy supplied from the 2H line memory 9, detects the diagonal correlation of the luminance signal, determines the direction in which the color-difference signal should be interpolated, and then outputs an interpolation direction signal dir.

Figure 2:
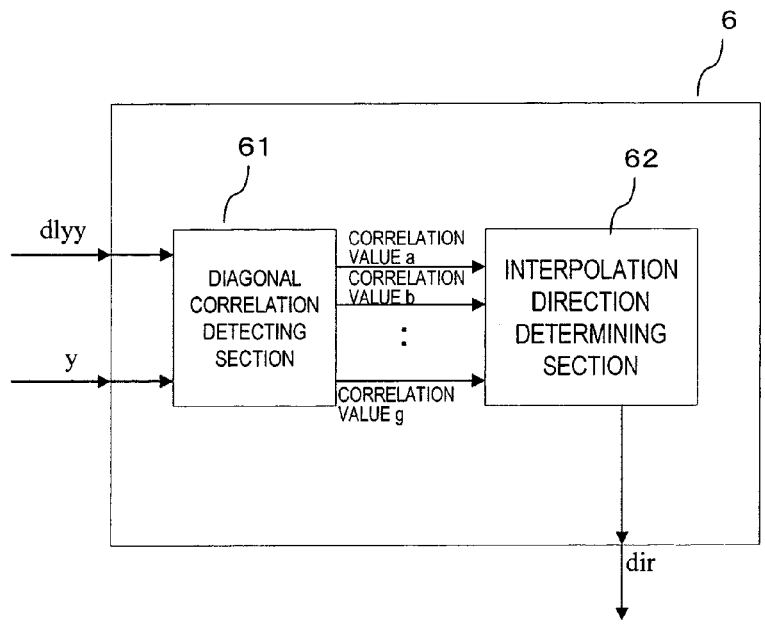
FIG. 2 illustrates a configuration for the diagonal correlation detecting and interpolation direction determining section in the preferred embodiment of the present invention.

FIG. 2 illustrates a configuration for the diagonal correlation detecting and interpolation direction determining section 6. A diagonal correlation detecting section 61 generates correlation values a through g based on the incoming luminance signal y and the delayed luminance signal dlyy. An interpolation direction determining section 62 searches for a direction in which there is the closest correlation based on those correlation values a through g (e.g., by looking for the smallest one of those correlation values a through g), thereby determining the direction to perform the interpolation in and outputting the interpolation direction signal dir.

Figure 3:
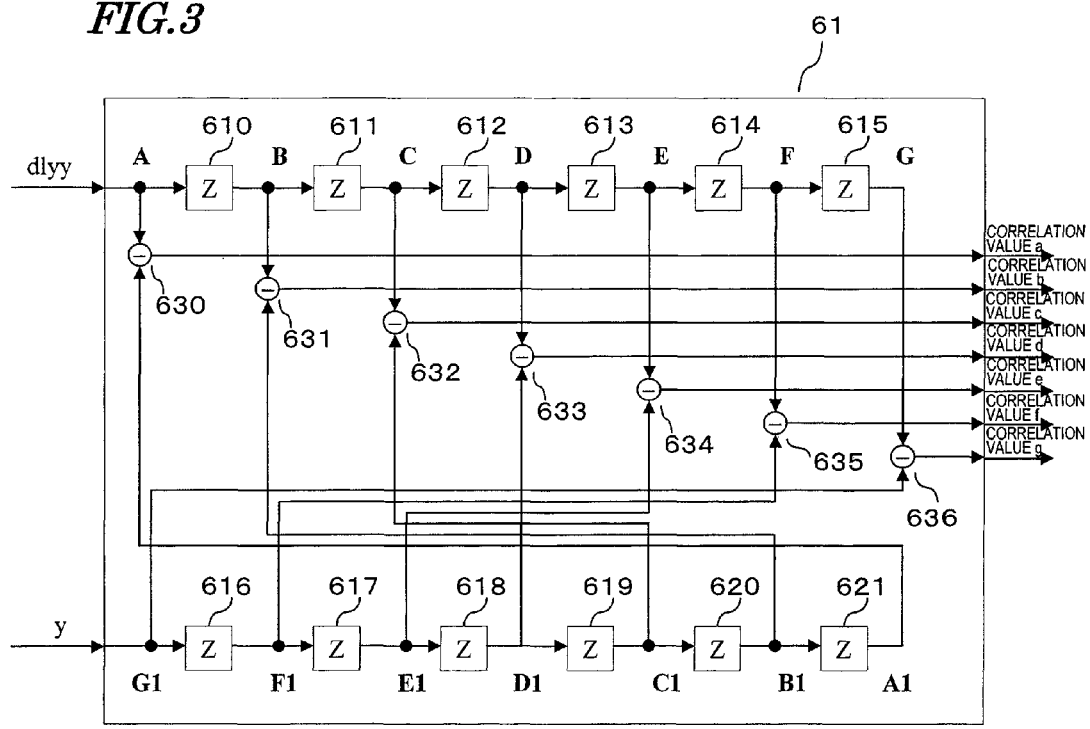
FIG. 3 illustrates a configuration for the diagonal correlation detecting section in the preferred embodiment of the present invention.

FIG. 3 illustrates a configuration for the diagonal correlation detecting section 61. Each of the delays 610 through 621 delays its input signal for one sample. The subtracter 630 obtains the correlation value a by subtracting a signal A1 from a signal A (i.e., calculating A−A1). The subtracter 631 obtains the correlation value b by subtracting a signal B1 from a signal B (i.e., calculating B−B1). The subtracter 632 obtains the correlation value c by subtracting a signal C1 from a signal C (i.e., calculating C−C1). The subtracter 633 obtains the correlation value d by subtracting a signal D1 from a signal D (i.e., calculating D−D1). The subtracter 634 obtains the correlation value e by subtracting a signal E1 from a signal E (i.e., calculating E−E1). The subtracter 635 obtains the correlation value f by subtracting a signal F1 from a signal F (i.e., calculating F−F1). And the subtracter 636 obtains the correlation value g by subtracting a signal G1 from a signal G (i.e., calculating G−G1).

Figure 4:
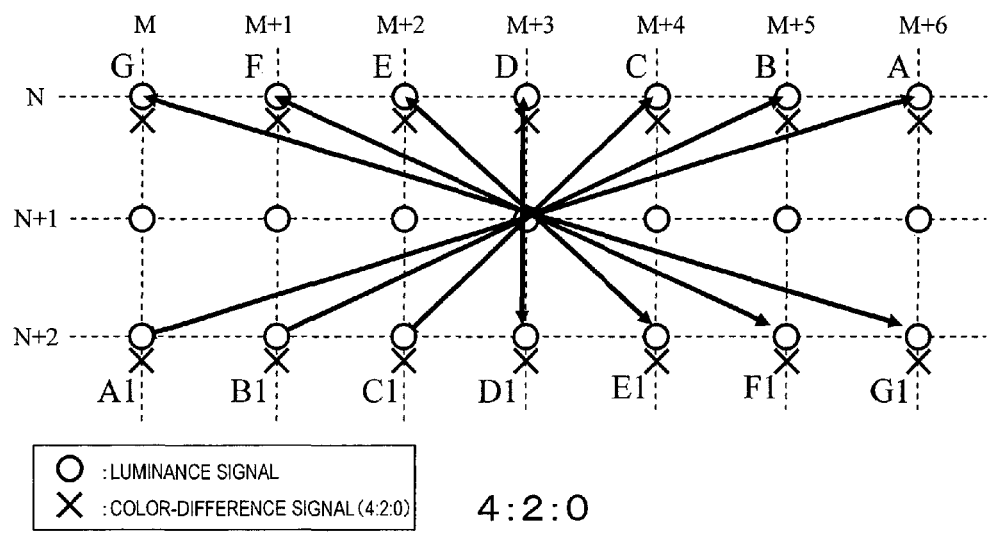
FIG. 4 illustrates an exemplary image signal to be calculated by the diagonal correlation detecting section in the preferred embodiment of the present invention.

FIG. 4 illustrates how the calculations shown in FIG. 3 are correlated with the image signals. On the display screen, a number of pixels are arranged in a matrix pattern and each of those pixels is associated with the luminance signal and the color-difference signal. In FIG. 4, the luminance signal is indicated by the open circle ○ and the color-difference signal is indicated by the cross x. In this description, a direction such as vertical direction and diagonal direction refers to a direction when the image signals are associated with such a display screen. As used herein, the "vertical direction" refers to the direction that is perpendicular to the horizontal scanning direction (e.g., line direction) and the "diagonal direction" refers to a direction that is defined diagonally with respect to the horizontal scanning direction.

As shown in FIG. 4, the signals A through G are associated with signals that are located at sample points (M+6) through M on an $N^{th}$ line. The signals A1 through G1 are associated with signals that are located at sample points M through (M+6) on an $(N+2)^{th}$ line. Thus, according to the calculations made in FIG. 3, the diagonal correlation between the luminance signals is calculated with respect to the sample point (M+3) on an $(N+1)^{th}$ line.

In this case, if the luminance signals A and A1 have close values due to the presence of a diagonal component such as an oblique line in the direction that connects together A and A1 on the image, then the correlation value a will be a small value. Likewise, if there is a diagonal component such as an oblique line in the direction that connects together B and B1 on the image, then the correlation value b will be a small value. The same can be said about any other pair of luminance signals. That is to say, if there is a close diagonal correlation between any two points on the image, their correlation value will be small. The interpolation direction determining section 62 determines the direction associated with the smallest one of these correlation values a through g to be the interpolation direction and outputs the interpolation direction signal dir. In the interpolation direction thus determined, the interpolated data generating section 8 generates and outputs an interpolated color-difference signal.

A color-difference signal c received at a color-difference signal input terminal 2 is then input to a line memory 7, which stores data about the color-difference signal c for one horizontal scanning period and will output a delayed color-difference signal dlyc in another horizontal scanning period. An interpolated data generating section 8 receives the color-difference signal c and the delayed color-difference signal dlyc, newly generates an interpolated color-difference signal based on these two color-difference signals, and then outputs it through a color-difference signal output terminal 4.

Figure 5:
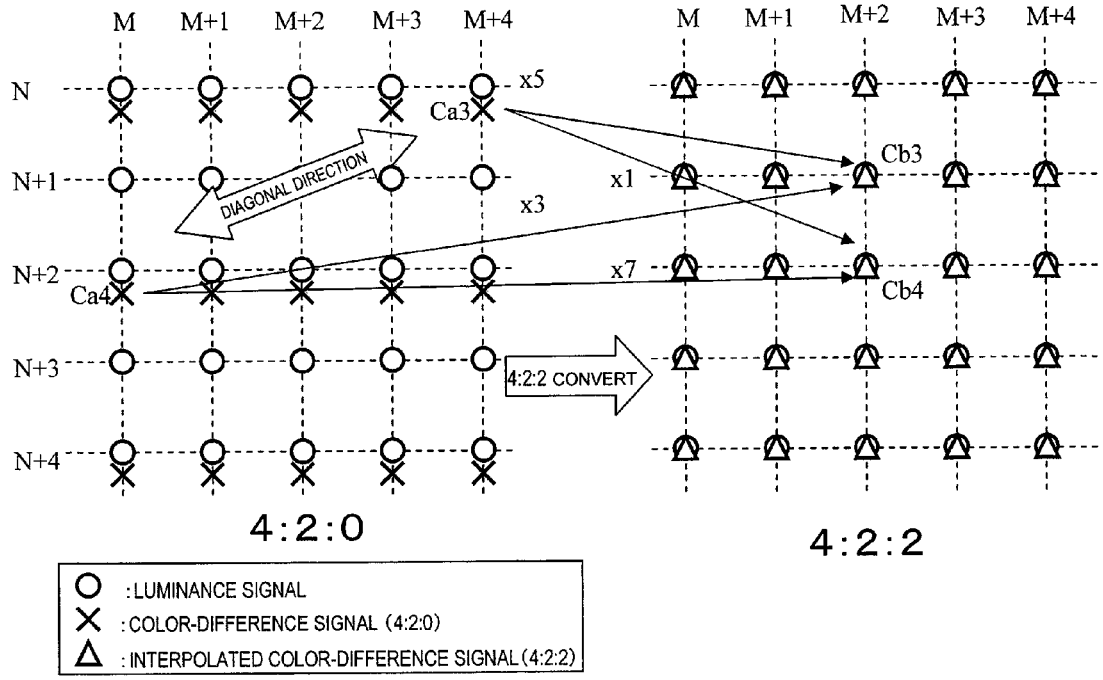
FIG. 5 illustrates how diagonal interpolation may be performed according to a preferred embodiment of the present invention.

FIG. 5 illustrates exemplary diagonal correction processing performed by the interpolated data generating section 8. In FIG. 5, the interpolated color-difference signals are indicated by open triangles Δ. In the example illustrated in FIG. 5, an interpolated color-difference signal is generated at a sample point (M+2) between the $(N+1)^{th}$ and $(N+2)^{th}$ lines. If the difference B–B1 has been found to be smaller than any other difference calculated by the diagonal correlation detecting section 61 (i.e., if the smallest one of the correlation value a through g has turned out to be the correlation value b), then the interpolation direction should be a direction that connects B and B1 together on the image (i.e., the direction that extends upper rightward and lower leftward from the point (N+1, M+2)). In that case, an interpolated color-difference signal Cb3 associated with the point (N+1, M+2) may be generated by the following equation:

$$Cb3=(Ca3\times 5+Ca4\times 3)/8$$

On the other hand, an interpolated color-difference signal Cb4 associated with the point (N+2, M+2) may be calculated by the following equation:

$$Cb4=(Ca3\times 1+Ca4\times 7)/8$$

If the smallest one of the correlation values a through g has turned out to be the correlation value d, then the interpolation direction should be vertical direction on the image.

By sequentially generating the interpolated color-difference signals as described above at the respective sample points of each line in the 4:2:0 sampling format, video data can be generated in the 4:2:2 sampling format.

According to the exemplary method of calculation described above, the interpolated color-difference signals Cb3 and Cb4 are obtained by adding weights to distances. However, the interpolated color-difference signals Cb3 and Cb4 may also be calculated by:

$$Cb3=(Ca3+Ca4)/2$$

$$Cb4=(Ca3+Ca4)/2$$

As described above, the image processing device 10 can interpolate a color-difference signal not just vertically but also diagonally as well based on a luminance signal. As a result, the color-difference signal can have its vertical resolution increased and has its block noise reduced, too.

According to the processing of converting an interlaced signal in the 4:2:2 sampling format into a progressive signal in the 8:4:4 sampling format described above, the amount of information that a luminance signal carries is increased by interpolating the luminance signal. However, as human eyes are sensible to luminance, an interpolation error on a luminance signal, if any, would make the viewer feel keenly a disturbance caused on an image due to that error. According to the present invention, however, the interpolation is supposed to be carried out only on color-difference signals, not on a luminance signal. That is why even if an interpolation error occurred, the disturbance caused on the image due to the error should be too little to be easily sensible to the viewer. On top of that, since no interpolation is made on the luminance signal, the overall computational complexity can be reduced eventually as well.

The image processing device of the present invention interpolates a color-difference signal diagonally in the interpolation direction that has been defined based on a luminance signal, thereby increasing the vertical resolution of the color-difference signal and reducing the block noise to be caused by MPEG compression as well. The present invention can be used effectively to an image processing device that converts video data in the 4:2:0 sampling format into the 4:2:2 sampling format or converts decoded data into interlaced one and then outputs it.

What is claimed is:

1. An image processing device that receives a video data signal, including a luminance signal and a color-difference signal, and generates a video data signal, of which the color-difference signal has been interpolated, the device comprising:
    an interpolation direction determining section for determining a direction in which the color-difference signal is going to be interpolated by using the luminance signal in the video data signal yet to be interpolated; and
    an interpolated color-difference signal generating section for generating an interpolated color-difference signal by interpolating the color-difference signal in the video data signal yet to be interpolated either vertically or diagonally in the interpolation direction determined by using the luminance signal.

2. The image processing device of claim 1, wherein the luminance signal is not interpolated.

3. The image processing device of claim 1, wherein the interpolation direction determining section calculates a difference between the luminance signals in each of multiple directions and determines the direction in which the color-difference signal is going to be interpolated based on the differences that have been calculated between the luminance signals.

4. The image processing device of claim 1, wherein the interpolated color-difference signal generating section generates the interpolated color-difference signal using components of the color-difference signal that are associated with the interpolation direction.

5. The image processing device of claim 1, wherein the video data signal yet to be interpolated has a sampling format in which a luminance signal (Y) and color-difference signals (Cb, Cr) are sampled at a ratio of 4:2:0, and
    wherein the interpolated video data signal has a sampling format in which the luminance signal (Y) and the color-difference signals (Cb, Cr) are sampled at a ratio of 4:2:2.

6. An image processing method for generating a video data signal, of which the color-difference signal has been interpolated, from a received video data signal including a luminance signal and the color-difference signal, the method comprising the steps of:
    determining a direction in which the color-difference signal is going to be interpolated by using the luminance signal in the video data signal yet to be interpolated; and
    interpolating the color-difference signal in the video data signal yet to be interpolated either vertically or diagonally in the interpolation direction that has been determined using the luminance signal, thereby generating an interpolated color-difference signal.

* * * * *